United States Patent [19]

Takahashi et al.

[11] Patent Number: 4,534,914
[45] Date of Patent: Aug. 13, 1985

[54] METHOD AND APPARATUS FOR PRODUCING VORTEX RINGS OF A GAS IN A LIQUID

[75] Inventors: Masashi Takahashi, Yokohama; Minoru Yamada, 309, Yamanouchi, Kamakura-shi, Kanagawa-ken, both of Japan

[73] Assignees: Nihon Sanso Kabushiki Kaisha; Minoru Yamada, both of Japan

[21] Appl. No.: 451,409

[22] Filed: Dec. 20, 1982

[30] Foreign Application Priority Data

Dec. 23, 1981 [JP] Japan .................................. 56-208638
Dec. 11, 1982 [JP] Japan .................................. 57-217412

[51] Int. Cl.³ .................................................. B01F 3/04
[52] U.S. Cl. ............................................. 261/64 B; 119/3;
119/5; 137/510; 137/624.14; 210/169;
210/221.2; 239/533.13; 261/62; 261/121 R
[58] Field of Search .................... 261/79 A, 62, 64 B,
261/64 R, 121 R, 121 M, 124; 239/533.13;
210/169, 198.2, 221.2; 43/56, 57; 119/3, 5;
137/510, 624.14

[56] References Cited

U.S. PATENT DOCUMENTS

| 653,677 | 7/1900 | Ibert | 261/79 A |
|---|---|---|---|
| 1,283,993 | 11/1918 | Wallace et al. | 137/510 X |
| 1,713,787 | 5/1929 | Stinson et al. | 261/64 R |
| 1,939,583 | 12/1933 | Welshausen | 261/121 M |
| 2,618,290 | 11/1952 | Van Vliet | 137/510 |
| 2,767,510 | 10/1956 | Hopkins | 261/121 M |
| 2,847,973 | 8/1958 | Pugh | 119/5 |
| 3,608,834 | 9/1971 | Maclaren | 261/124 X |
| 3,651,646 | 2/1972 | Grunau | 261/124 X |
| 3,754,740 | 8/1973 | Piper | 261/124 |
| 4,088,716 | 5/1978 | Stoev et al. | 261/64 R |

*Primary Examiner*—Richard L. Chiesa
*Attorney, Agent, or Firm*—Darby & Darby

[57] ABSTRACT

A method and apparatus for producing vortex rings of a gas in a liquid. The apparatus includes: an accumulator including a gas outlet for discharging the gas and a gas inlet for introducing a gas from a gas supply source thereinto; a nozzle attached to the outlet of the accumulator in a communicating relation to the accumulator, the nozzle being of elasticity such that the nozzle is sealingly closed under liquid pressure when used; valve, connected to the accumulator, for permitting a gas supply from the gas supply source to the nozzle; and a mechanism for actuating the valve when gas pressure within the accumulator reaches predetermined pressure levels. In the method an accumulator is positioned in the liquid, and then the gas under pressure higher than that in the liquid surrounding the accumulator is supplied to the accumulator, from which the supplied gas is introduced into a nozzle communicated to the accumulator to open the nozzle against the pressure in the surrounding liquid. Then, in the nozzle there is formed a stream of the gas having a higher velocity at the center of the nozzle than that at the inner periphery of the nozzle so that a vortex ring of the gas is formed. The formed vortex ring is ejected from the nozzle into the liquid. The gas supply to the nozzle is stopped and thereby the nozzle is closed under the pressure in the surrounding liquid.

13 Claims, 13 Drawing Figures

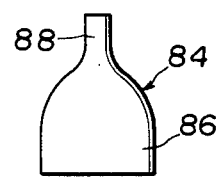
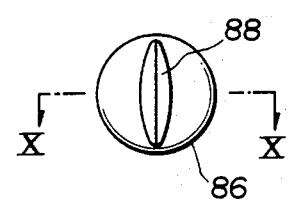
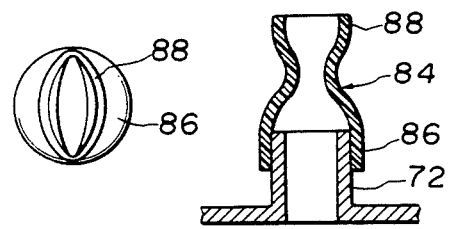
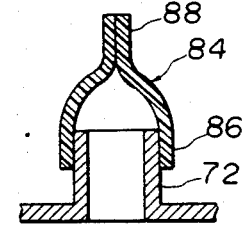

1

METHOD AND APPARATUS FOR PRODUCING VORTEX RINGS OF A GAS IN A LIQUID

BACKGROUND OF THE INVENTION

The present invention relates to a method and an apparatus for producing vortex rings of a gas in a liquid for use in aquaria, fish farms, sewage disposal facilities and the like.

Conventionally, aquarium fish tanks, fish-farming ponds, and the like are provided with air or oxygen gas supply devices to produce spherical or medusoid bubbles in the water through nozzles and the like placed underwater for increasing or maintaining oxygen concentration in the water at a predetermined level and particularly in aquarium fish tanks for enjoyment purpose. However, in the conventional gas supply devices, dissolution of oxygen into water is not efficient for the amount of air or oxygen gas supplied and for the size of devices used. Furthermore, bubbles in the water do not provide much pleasure to spectators.

SUMMARY OF THE INVENTION

Accordingly, it is an object of the present invention to provide a method and an apparatus for producing vortex rings in a liquid which largely increases gas dissolution efficiency.

It is another object of the present invention to provide a method and an apparatus for producing vortex rings in a liquid which produces a strong upward current whereby forced circulation of the liquid is effected.

It is a further object of the present invention to provide a method and an apparatus for producing vortex rings in a liquid which give mysterious feelings and pleasure to spectators.

In view of these and other objects in view, one aspect of the present invention is directed to an apparatus for producing vortex rings of an gas in a liquid, comprising: (a) an accumulator including a gas inlet for introducing the gas from a gas supply source thereinto and a gas outlet for discharging the gas; (b) a nozzle attached to the outlet of the accumulator in a communicating relation to the accumulator, the nozzle being of elasticity such that the nozzle is sealingly closed under liquid pressure when used; (c) valve means, connected to the accumulator, for permitting a gas supply from the gas supply source to the nozzle; and (d) means for actuating the valve means when gas pressure within the accumulator reaches predetermined pressure levels.

The other aspect of the present invention is directed to a method of producing vortex rings of a gas in a liquid, comprising the steps of: (a) positioning an accumulator in the liquid; (b) supplying the accumulator with the gas under pressure higher than that in the liquid surrounding the accumulator; (c) providing the supplied gas to a nozzle communicated to the accumulator to open the nozzle against the pressure in the surrounding liquid; (d) then forming a gas stream at a higher velocity at the center of the nozzle than that at the inner periphery of the nozzle so that a vortex ring of the gas is formed; (e) ejecting the formed vortex ring from the nozzle into the liquid; and (f) stopping the gas supply to the nozzle to thereby close the nozzle by the pressure in the surrounding liquid.

BRIEF DESCRIPTION OF THE DRAWINGS

While the specification concludes with claims which particularly point out and distinctly define the subject matter which is regarded as the invention, it is believed the invention will be more clearly understood when considering the following detailed description and the accompanying drawings, in which:

FIG. 9A is a side view of a modified form of the nozzle in FIG. 1;

FIG. 9B is a plan view of the nozzle in FIG. 9A;

FIG. 10 is a view taken along the line X—X in FIG. 9B;

FIG. 11A is a plan view showing the nozzle in FIG. 9A when it is opened; and

FIG. 11B is a vertical section of the nozzle in FIG. 11A.

DETAILED DESCRIPTION OF THE PREFERRED EMBODIMENTS

Figure 1:
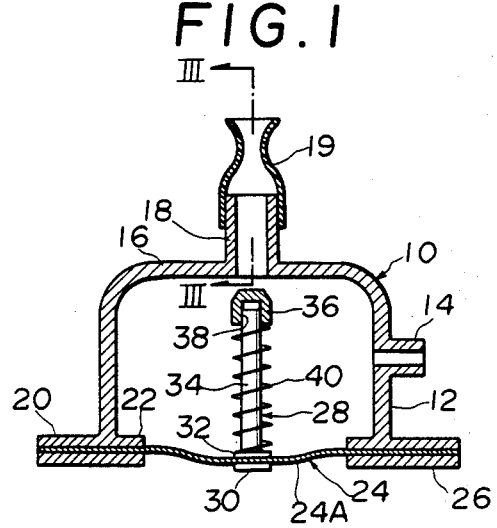
FIG. 1 is a vertical section of a vortex ring producing apparatus according to the present invention when it is in operation.
Figure 2:
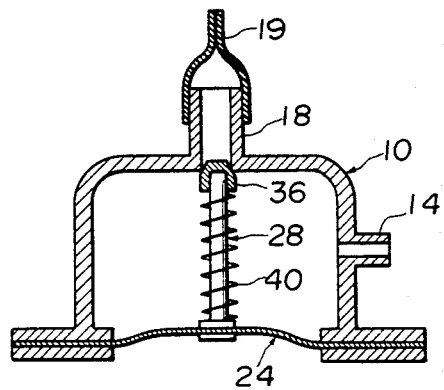
FIG. 2 is a vertical section of the vortex ring producing apparatus in FIG. 1 when it is in a nonoperative condition.
Figure 3:
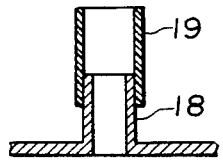
FIG. 3 is a fragmentary view taken along the line III—III in FIG. 1.

Referring to FIGS. 1 to 3, there is illustrated an apparatus for producing vortex rings underwater constructed according to the present invention, in which reference numeral 10 designates an accumulator made of a corrosion-resisting material such as stainless steel, plastic materials, etc. The accumulator 10 is generally of an inverted cylindrical cup shape, and has an inner volume of 2 l. The accumulator is provided at its side wall or skirt portion 12 with a gas inlet 14 for introducing a gas such as air, oxygen gas, or the like from a gas supply source (not shown) into the accumulator 10. The accumulator 10 is further provided at the center of its top wall 16 with a gas outlet 18 for allowing the gas within the accumulator 10 to enter a nozzle 19 which is sealingly fitted around the outlet 18, and at the lower edge of its side wall 12 with a circumferential flange 20 which extends radially outwardly and inwardly from that lower edge. The inner edge of the flange 20 defines an opening 22. The bottom of the accumulator 10 is covered with a circular diaphragm 24 of a resilient material such as rubber, which is sealingly secured at its peripheral portion to the flange 20 by a securing ring 26 with bolts and nuts (not shown) in a sandwich manner. A spindle 28 with a head 30 passes through the center of the diaphragm 24 and is sealingly fastened there by cramping the central portion of the diaphragm 24 against the head 30 of the spindle 28 by means of a nut member 32 which is threaded with the proximal portion of a shank 34 of the spindle 28, so that the spindle 28 is supported by the diaphragm 24 to extend axially within the accumulator 10. The free end of the spindle 28 is slidable fitted into an axial bore 38 of a valve member 36, the valve member 36 having a frustoconical portion formed at its upper portion. The valve member 36 is connected to the nut member 32 through a compression coil spring 40 which extends around the shank 34 of the spindle 28. As shown in FIG. 2, in a non-operating condition the valve member 36 is urged by the coil spring 40 toward the gas outlet 18 to bring the frustoconical portion thereof into sealing contact with the inner opening of that outlet 18, the inner opening serving as a valve seat. The valve member 36 and the inner opening of the outlet 18 constitute valve means for permitting a gas supply from the gas supply source to the nozzle 19. The guide pin 28, coil spring 40, and an expandable portion 24A of the diaphragm 24 form means for actuating the valve means for opening and closing the valve means. The nozzle 19 is of hollow cylindrical shape, and is made of a resilient material such as rubbers, synthetic resins and the like. The nozzle 19 is designed to have elasticity such that it is sealingly closed under water pressure when used at a predetermined depth. That is, it serves as a check valve.

When used, the apparatus is located in a predetermined position underwater or under seawater with the nozzle 19 placed uppermost. In the above-described embodiment the apparatus is placed at a depth of about 3 to 30 m from the surface of the water. Assuming that the apparatus is in a non-operating condition, as shown in FIG. 2 the nozzle 19 is closed by water pressure, and the diaphragm 24 is at its return position where it urges the valve member 36 in cooperation with the coil spring 40 to bring that valve member 36 into contact with the outlet 18 for closure of the outlet. In operation, a gas under pressure is introduced from the gas supply source through the gas inlet 14 into the accumulator 10. As a result, the pressure in the inside of the accumulator increases, which causes the diaphragm 24 to be outwardly inflated against the surrounding water pressure and the force of the spring 40, with the result that the valve member 36 is brought out of contact with the gas outlet 18. Thus, the gas stored in the accumulator 10 is discharged through the outlet 18 into the nozzle 19 which is closed by water pressure, so that the nozzle is instantaneously opened as shown in FIG. 1, thereby ejecting the gas into the water to form a vortex ring. When the gas is released, the pressure within the accumulator 10 is rapidly dropped, so that the diaphragm 24 is returned from the inflated position in FIG. 1 to the initial position in FIG. 2 with the result that the valve member 36 is urged against the outlet 18, and thereby the outlet 18 is closed. Also, the nozzle 19 is immediately closed by the surrounding water pressure. Vortex rings are produced by the instantaneous opening and closing motions of the valve member 36 and the nozzle 19. The above-described operation of the apparatus is repeated unless the gas supply from the gas supply source is stopped.

From our experiments it has been found that the following conditions are required for the formation of vortex rings:

(a) Gas pressure in the accumulator must be slightly higher than the pressure of the liquid surrounding the accumulator by generally about 50 to 150 mm Aq., in a particular case to 300 mm Aq. A constant amount of the gas must be instantaneously discharged from the nozzle.

Figure 4:
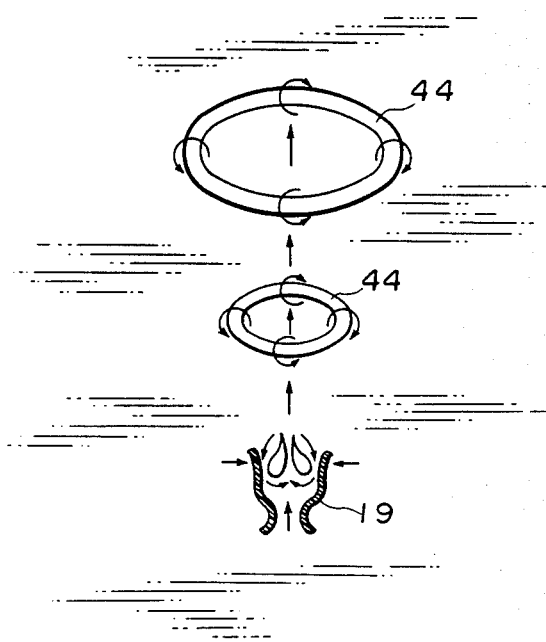
FIG. 4 is an illustration as to how vortex rings are formed, in which the nozzle is shown in vertical section.

(b) When the gas is released from the nozzle, the velocity of the gas stream at the center of the nozzle must be higher than that at the inner periphery thereof to thereby rotate the gas from the inside to the outside as shown in FIG. 4.

(c) The nozzle must have a structure such that just before and after the gas is discharged from the nozzle no bubble is produced and no water enters thereinto. In the embodiment described, a series of masses of air at a pressure higher than the surrounding water pressure by 50 mm Aq. was successively ejected from the nozzle 19, whereby vortex rings 44 were successively produced as shown in FIG. 4. These vortex rings 44 went upwards, rotating at a high speed from the inside to the outside. Near the surface of the water the diameter of each vortex ring increased largely. Mutual slip-through of adjacent two vortex rings were observed. The diameter of the subsequent ring became smaller than that of the preceding one and it traveled faster than the latter. Then, the subsequent ring slipped through the preceding one. Next, the latter slipped through the former. A high speed upward current of water which passed through the center of the vortex rings 44 was observed.

It is believed that the speed of the upward current is defined in combination with a speed induced by the vortex rings, buoyancy, and kinetic energy given to those rings. The high speed upward current of the water may be used for enforced circulation of liquid. Furthermore, by the production of vortex rings of a gas in water or other liquid the speed of dissolution of the gas into the liquid is fairly increased as compared to oxygen dissolving systems of the prior art. This is because vortex rings have high contact pressure and large contact surface area with the surrounding liquid because of the high speed rotation. In addition various kinds of gases may be used form making vortex rings. Thus, the present invention may be applied to fish keeping, fish farming, water treatment such as activated-sludge process, malodorproof treatment, and the like, gas dissolution, etc. In addition to the already-mentioned interesting behaviours of vortex rings, they may be colored by the use of colored smokes in the supply gas or by illumination light. Thus, the present invention may be used as an apparatus for supplying gas into water for interior decoration provisions such as tropical fish glass tanks.

Figure 5:
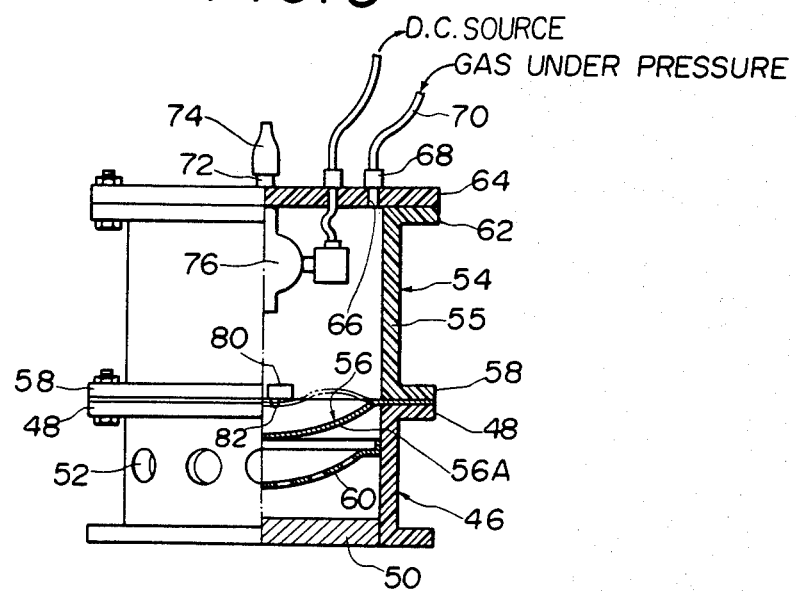
FIG. 5 is a side view partly in section illustrating another embodiment of the present invention.
Figure 6:
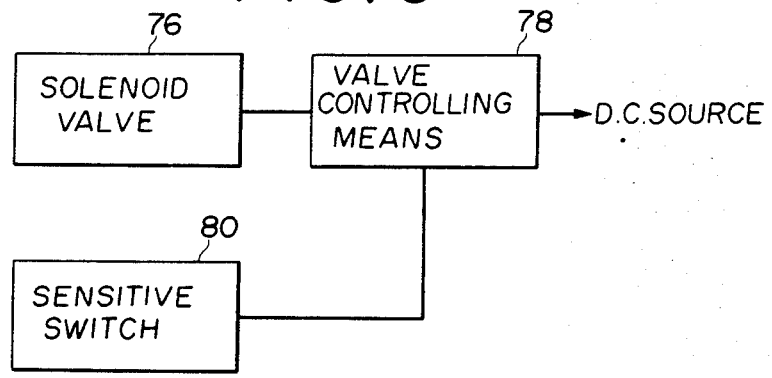
FIG. 6 is a block diagram illustrating a solenoid valve controlling system.

FIG. 5 illustrates another embodiment of the present invention, in which reference number 46 indicates a supporting member of a hollow cylinder. The supporting member 46 is provided at its upper open end with a peripheral flange 48 which extends radially outwardly. A weight plate 50 is attached to the lower open end of the supporting member 46. The supporting member 46 is further provided at its body portion with a predetermined number of openings for communicating a surrounding liquid. An accumulator 54 of a hollow cylinder shape and of the same diameter as the supporting member 46 is sealingly fastened above the supporting member 46 through a diaphragm 56 of a resilient material such as rubber. Specifically, the peripheral portion of the diaphragm 56 is cramped between the peripheral flange 48 of the supporting member 46 and a lower peripheral flange 58 which is integrally formed with the lower open end of the accumulator 54 to extend radially outwardly, and is fastened by means of bolts and nuts. A dome-shaped protective plate 60 having a large number of throughholes is attached to the inner wall of that body portion for preventing the bursting of the diaphragm 56 due to overinflation. The accumulator 54 is provided at its upper open end with an upper peripheral flange 62 which extends radially outwardly. A disc-shaped cover plate 64 of a transparent acrylic resin is sealingly fastened through a rubber O-ring (not shown) to the upper peripheral flange 62 of the accumulator 54 by means of bolts and nuts. The cover plate 64 is provided with a gas inlet 66, which is connected through a conventional joint 68 to a conduit 70. A gas such as air, oxygen, etc is supplied from a pressurized gas supply source (not shown) through the conduit 70 into the accumulator 54. The accumulator 54 is further provided at its central portion with a gas outlet 72, around which a hollow cylindrical nozzle 74 of resilient material such as rubbers, synthetic resins or the like is sealingly fitted. Directly connected to the inner end of the gas outlet 72 is a solenoid valve 76, which is electrically connected to a D.C. power source located on the ground through a valve controlling means 78 shown in FIG. 6, the valve controlling means including an electromagnetic relay and a delay circuit (both members not shown). The valve controlling means 78 is disposed within the accumulator 54, and is electrically connected to a sensitive switch 80 sold under the trade name "Microswitch", which constitutes means for detecting the position of the movable portion 56A of the diaphragm 56. The sensitive switch 80 is attached to the inner wall of the accumulator 54 so that a plunger 82 thereof is pushed by the movable portion 56A of the diaphragm to activate the sensitive switch when that movable portion is in a return position shown by the phantom line in FIG. 5. The movable portion 56A of diaphragm 56, sensitive switch 80, and valve controlling means 78 constitute means for actuating the solenoid valve 76. The accumulator 54 and supporting member 46 are made of a corrosion-resisting material such as stainless steel, synthetic resins, etc, in this embodiment vinyl chloride resin.

When used, the apparatus of the above-described second embodiment is placed at a depth of about 3 to 30 m from the surface of the water or seawater. Assuming that the apparatus is in a non-operating condition, the diaphragm 56 is in the return position shown by the phantom line in FIG. 5, and the nozzle 74 is closed. In operation, a gas under pressure is introduced through gas inlet 66 into accumulator 54. As a result, the pressure in the inside of the accumulator 54 increases, which causes the diaphragm 56 to be inflated, with the result that the movable portion 56A of diaphragm 56 moves away from plunger 82 to thereby activate the sensitive switch 80. Thus, sensitive switch 80 provides the electromagnetic relay of valve controlling means 78 with a signal to close a contact thereof, so that the solenoid valve 76 is energized and is thereby opened. Simultaneously with this actuation of solenoid valve 76, the delay circuit of valve controlling means 78 is actuated. The gas under pressure in the accumulator 54 is introduced through the gas outlet 72 into the nozzle 74 which is closed under water pressure, and thereby nozzle 74 opens instantaneouly and ejects the gas into the water as shown in FIG. 4. The pressure within the accumulator 54 drops rapidly, so that the diaphragm 56 returns from an inflated position shown by the solid line in FIG. 5 to the return position. Before or when the diaphragm 56 reaches the return position, that is, when about 0.1 to 1 second passes from the actuation of the sensitive switch 80, the above-described delay circuit acts to open the contacts of the electromagnetic relay, so that the solenoid valve 76 is de-energized and thereby closed. Thus, the gas supply from the gas outlet 72 to the nozzle 74 is stopped and thereby the nozzle 74 is instantaneously closed to form a vortex ring. The above-described operation of the apparatus is repeated unless gas supply from the gas supply source is stopped.

Figure 7:
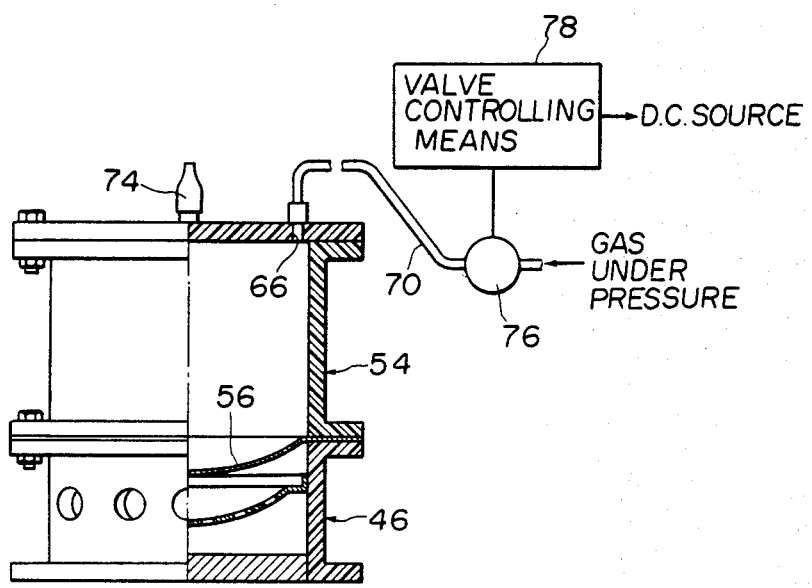
FIG. 7 is a side view partly in section illustrating a still another embodiment of the present invention.

In FIG. 7 there is illustrated a third embodiment of the present invention, which is different from the second embodiment in that the sensitive switch 80 is not used, and in that the solenoid valve 76 is interposed between a pressurized gas supply source (not shown) and the duct 70 which is connected to gas inlet 66. In this embodiment, the solenoid valve 76 and the valve controlling means 78 as the valve actuating means are placed on the ground. The valve controlling means 78 includes an electromagnetic relay and a timer for activating the electromagnetic relay every preset time period. (both members not shown).

In the third embodiment, the electromagnetic valve 76 is normally opened. When a valve (not shown) of the pressurized gas supply source is opened, the above-mentioned timer of valve controlling means 78 starts, and on the other hand a gas under pressure enters accumulator 54 through electromagnetic valve 76. As a result, diaphragm 56 is inflated and nozzle 74 is opened due to an increase in pressure in accumulator 54, so that a vortex ring is formed. After ejection of the gas, diaphragm 56 returns from an inflated position in FIG. 7 to a return position (not shown). Before or when diaphragm 56 returns to the return position, the timer provides the electromagnetic relay with a signal to close a make contact thereof and thereby the solenoid valve 76 is closed, with the result that supply of the gas to accumulator 54 is stopped. Thus, the nozzle 74 is instantaneously closed to form a vortex ring. This operation of the apparatus is repeated unless the supply of the gas is stopped by closing the valve of the gas supply source.

In the third embodiment, the diaphragm 56 may be omitted.

Figure 8:
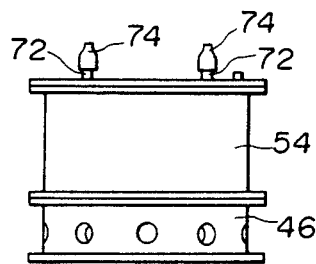
FIG. 8 is a side view of a still further embodiment of the present invetion.

FIG. 8 illustrates a still further embodiment of the present invention, which is different from the preceding embodiments in that the accumulator 54 is provided with two gas outlets 72 and 72. Each outlet 72 is fitted with a nozzle 74. In this embodiment it was observed that two horizontally adjacent vortex rings produced attracted each other into a larger one.

FIGS. 9A to 11B illustrates a modified form of the nozzle. This nozzle 84 includes a dome-shaped body portion 86 and a lip-shaped valve portion 88 which is integrally formed with the top of the body portion 86 so as to communicate to that body portion. The nozzle 84 is made of a resilient material such as rubbers, synthetic resins, and the like by molding. The length of the valve portion 88 is about 3 to 25 mm. FIGS. 9A to 10 shows the nozzle 84 closed, and FIG. 11A to FIG. 11B shows the nozzle opened. The valve portion 88 completely closes the nozzle by water pressure applied thereon.

While the invention has been disclosed in specific detail for purposes of clarity and complete disclosure, the appended claims are intended to include within their meaning all modification and changes that come within the true scope of the invention.

What is claimed is:

1. An apparatus for producing vortex rings of a gas in a liquid, comprising:
   (a) an accumulator including a gas inlet for introducing the gas under pressure from a gas supply source thereinto, and a gas outlet for discharging the gas;
   (b) a nozzle attached to the outlet of the accumulator in communicating relation to the accumulator, the nozzle being of elasticity such that the nozzle is sealingly closed when the liquid pressure exceeds the gas pressure; and (c) valve means, connected to the accumulator, for permitting a gas supply from the gas supply source to the nozzle and forming a gas stream at a higher velocity at the center of the nozzle than that at the inner periphery of the nozzle so that said vortex ring of the gas is formed; and (d) means for actuating the valve means when gas pressure within the accumulator reaches predetermined pressure levels.

2. An apparatus as recited in claim 1 further comprising a diaphragm sealingly attached at its peripheral portion to an opening formed in the accumulator, the diaphragm having a portion movable between a return position and an inflated position.

3. An apparatus as recited in claim 2, wherein the valve means includes a valve member and an inner opening of the gas outlet, the valve member being adapted to seat on the inner opening, and wherein the actuating means includes the movable portion of the diaphragm and a compression spring member connecting the valve member to the movable portion for urging the valve member to the inner opening of the gas outlet.

4. An apparatus as recited in claim 3, wherein the actuating means further includes a spindle member attached at its one end to the movable portion of the diaphragm, and wherein the valve member has a bore formed therein, the other end of the spindle member being slidably fitted into the bore, and the spring member is a coil spring extending around the spindle member.

5. An apparatus as recited in claim 1 or 2, wherein the valve means is a solenoid valve interposed between the gas inlet and the gas supply source.

6. An apparatus as recited in claim 5, wherein the actuating means includes an electromagnetic relay for actuating the solenoid valve, and a timer for actuating the relay every preset time interval.

7. An apparatus as recited in claim 2, wherein the valve means is a solenoid valve connected to the gas outlet, and wherein the actuating means includes a detector for detecting a predetermined position of the movable portion of the diaphragm and supplying a signal to open the solenoid valve, and a valve controlling means, electrically connected to the detector and the solenoid valve, for actuating the solenoid valve for opening according to the open signal from the detector.

8. An apparatus as recited in claim 7, wherein the valve controlling means includes an electromagnetic relay for activating the solenoid valve, and a delay circuit for deactivating the relay after a predetermined time interval upon receipt of the open signal from the detector.

9. An apparatus as recited in claim 8, wherein the detector is one of sensitive switch, reed switch, and non contact adjacent switch.

10. A method of producing vortex rings of a gas in liquid, comprising the steps of:

(a) positioning an accumulator in the liquid, the accumulator having a gas outlet and a valve member for closing the gas outlet;

(b) supplying the accumulator with the gas under pressure higher than that in the liquid surrounding the accumulator;

(c) providing the supplied gas to a nozzle communicated to the accumulator by bringing the valve member out of contact with the gas outlet thereby opening the nozzle instantaneously against the pressure in the surrounding liquid;

(d) then forming a gas stream at a higher velocity at the center of the nozzle than that at the inner periphery of the nozzle so that a vortex ring of the gas is formed;

(e) ejecting instantaneously the formed vortex ring from the nozzle into the liquid; and (f) stopping instantaneously the gas supply to the nozzle to thereby close the nozzle by the pressure in the surrounding liquid.

11. A method as recited in claim 10, wherein the pressure in the gas supplied to the accumulator is higher than that in the surrounding liquid by about 50 to about 300 mm Aq.

12. A method as recited in claim 11, wherein the gas is one of air, oxygen, and helium, and wherein the liquid is one of water and seawater.

13. A method as recited in claim 11 or 12 wherein the gas contains a colored smoke whereby the vortex ring produced is colored.

* * * * *